United States Patent [19]

Weder

[11] Patent Number: 5,448,875
[45] Date of Patent: * Sep. 12, 1995

[54] WRAPPING A FLORAL GROUPING WITH EMBOSSED SHEETS HAVING ADHESIVE OR COHESIVE MATERIAL APPLIED THERETO

[75] Inventor: Donald E. Weder, Highland, Ill.

[73] Assignee: Highland Supply Corporation, Highland, Ill.

[ * ] Notice: The portion of the term of this patent subsequent to Jan. 26, 2093 has been disclaimed.

[21] Appl. No.: 264,866

[22] Filed: Jun. 23, 1994

Related U.S. Application Data

[63] Continuation of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, and a continuation-in-part of Ser. No. 391,463, Aug. 9, 1989, abandoned.

[51] Int. Cl.⁶ .................... B65B 51/02; B65B 61/06
[52] U.S. Cl. ................................. 53/397; 53/465
[58] Field of Search ............ 53/397, 398, 461, 462, 53/465, 399, 216, 219; 206/423, 460; 229/87.01; 47/72, 41.01

[56] References Cited

U.S. PATENT DOCUMENTS

| Re. 21,065 | 5/1939 | Copeman . | |
|---|---|---|---|
| 732,889 | 7/1903 | Paver . | |
| 1,446,563 | 2/1923 | Hughes . | |
| 1,525,015 | 2/1925 | Weeks . | |
| 1,863,216 | 6/1932 | Wordingham . | |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,278,673 | 4/1942 | Savada et al. | 154/43 |
| 2,302,259 | 11/1942 | Rothfuss | 41/10 |
| 2,355,559 | 8/1944 | Renner | 229/8 |
| 2,371,985 | 3/1945 | Freiberg | 206/46 |
| 2,411,328 | 11/1946 | MacNab | 32/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 3,022,605 | 2/1962 | Reynolds | 47/58 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,508,372 | 4/1970 | Wallerstein et al. | 53/3 |

(List continued on next page.)

FOREIGN PATENT DOCUMENTS 2610604 8/1988 France .
345464 2/1917 Germany .

OTHER PUBLICATIONS

Exhibit F –Post It Note Pad ® Manufactured by 3M Commercial Office Supply Division, St. Paul, Minn. 55144-1000. (Undated).

"The Simple Solution For Those Peak Volume Periods", Speed Cover Brochure, Highland Supply Corporation, 1989.

*Primary Examiner*—Horace M. Culver
*Attorney, Agent, or Firm*—Dunlap Codding

[57] ABSTRACT

A method for wrapping a floral grouping wherein a plurality of sheets of material are connected into a pad of sheets of material. The pad has a top sheet of material with the other sheets of material being disposed under the top sheet of material. The floral grouping is placed on the top sheet of material. The top sheet of material is wrapped about a portion of the floral grouping and the top sheet of material and the floral grouping are rolled to wrap the floral grouping in the top sheet of material and simultaneously disconnect the top sheet of material from the pad. The sheets of material are secured about the floral grouping in a wrapped position by an adhesive or cohesive on the sheets of material and the sheets of material are secured in the form of the pad by the adhesive or cohesive materials on the sheet.

40 Claims, 4 Drawing Sheets

U.S. PATENT DOCUMENTS

| | | | |
|---|---|---|---|
| 3,620,366 | 11/1971 | Parkinson et al. | 206/59 |
| 3,681,105 | 8/1972 | Milutin et al. | 117/15 |
| 3,793,799 | 2/1974 | Howe et al. | 53/32 |
| 4,054,697 | 10/1977 | Reed et al. | 428/40 |
| 4,118,890 | 10/1978 | Shore | 47/28 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,300,312 | 11/1981 | Weder | 47/72 |
| 4,333,267 | 6/1982 | Witte | 47/84 |
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,640,079 | 2/1987 | Stuck | 53/390 |
| 4,765,464 | 8/1988 | Ristvedt | 206/0.82 |
| 4,773,182 | 9/1988 | Weder et al. | 47/72 |
| 4,996,822 | 3/1991 | Truppe | 53/216 X |

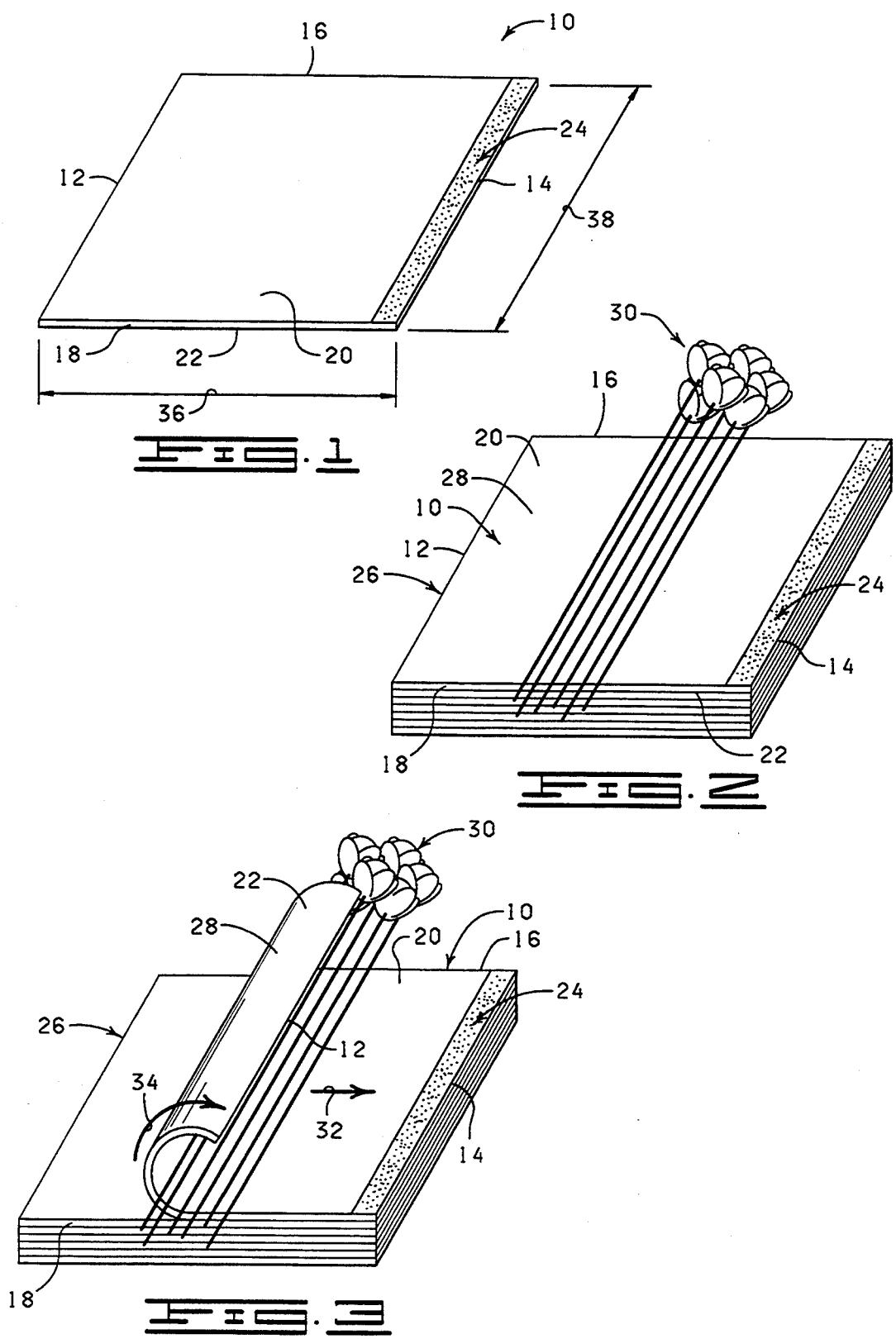

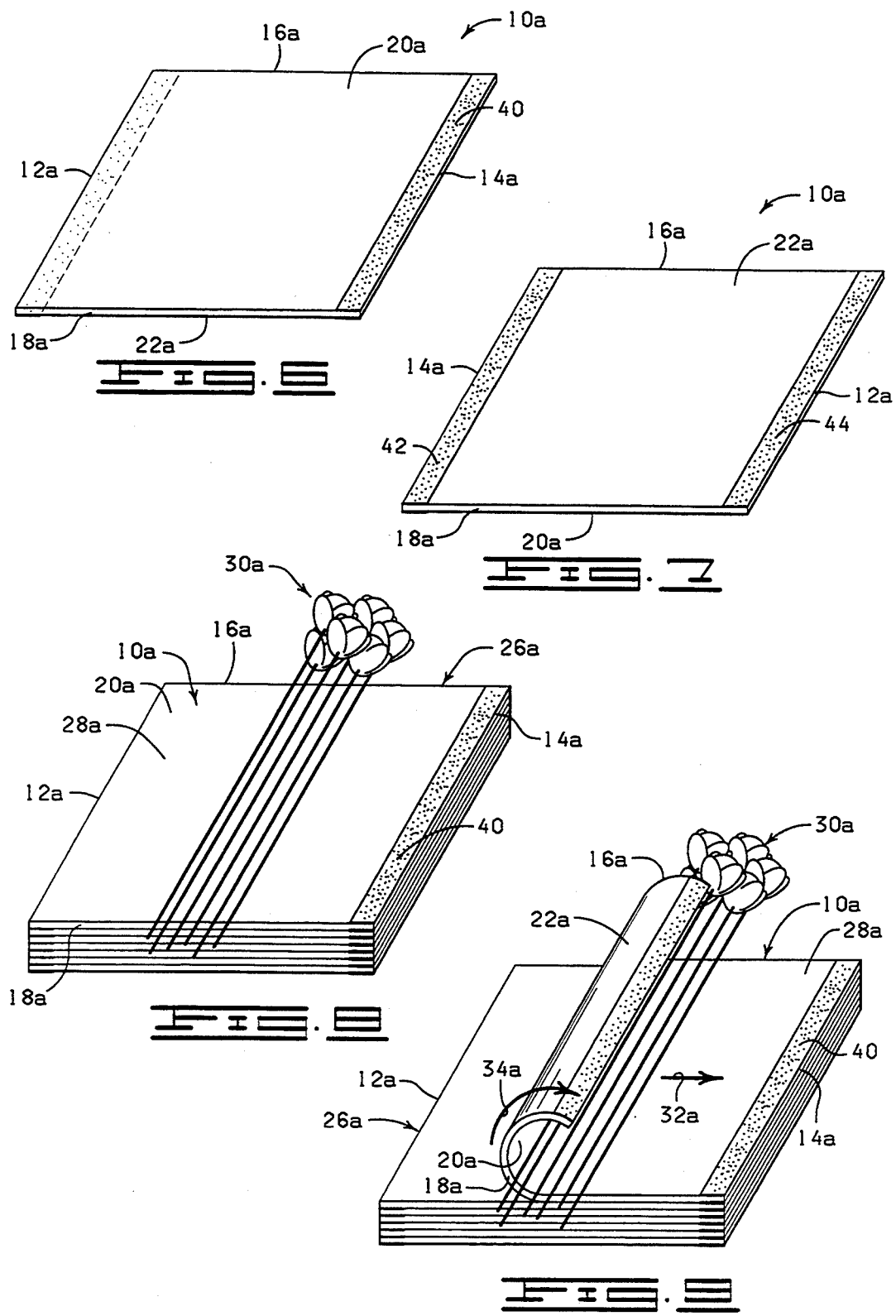

1

WRAPPING A FLORAL GROUPING WITH EMBOSSED SHEETS HAVING ADHESIVE OR COHESIVE MATERIAL APPLIED THERETO

CROSS REFERENCE TO RELATED APPLICATIONS

This is a continuation of application Ser. No. 07/965,585, filed Oct. 23, 1992, entitled "WRAPPING A FLORAL GROUPING WITH SHEETS HAVING ADHESIVE OR COHESIVE MATERIAL APPLIED THERETO" now abandoned; which is a continuation of application Ser. No. 07/893,586, filed Jun. 2, 1992, entitled "WRAPPING A FLORAL GROUPING WITH SHEETS HAVING ADHESIVE OR COHESIVE MATERIAL APPLIED THERETO", now U.S. Pat. No. 5,181,364; which is a continuation of Ser. No. 07/707,417 filed on May 28, 1991, entitled "WRAPPING A FLORAL GROUPING WITH SHEETS HAVING ADHESIVE OR COHESIVE MATERIAL APPLIED THERETO", now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned, which was a continuation-in-part of the applications: METHOD FOR WRAPPING AN OBJECT A MATERIAL HAVING PRESSURE SENSITIVE ADHESIVE THEREON, filed Sep. 26, 1988, U.S. Ser. No. 07/249,761, now abandoned; and ADHESIVE APPLICATOR, filed Aug. 9, 1989, U.S. Ser. No. 07/391,463, now abandoned.

FIELD OF THE INVENTION

The present invention relates generally to the wrapping of a floral grouping with a sheet of material by placing the floral grouping on a top sheet of material of a pad of sheets of material and then wrapping the top sheet of material about the floral grouping and simultaneously disconnecting the top sheet of material from the pad.

BRIEF DESCRIPTION OF THE DRAWINGS

FIG. 1 is a elevational view of the upper surface of a sheet of material of the type contemplated by the present invention.

FIG. 2 is an elevational view of a plurality of sheets of material with each sheet being constructed as shown in FIG. 1 and with the sheets connected together to form a pad of sheets of material, a floral grouping being shown in FIG. 2 disposed on a portion of the top sheet of material of the pad.

FIG. 3 is a partial perspective view of the pad, similar to FIG. 2, but showing a portion of the top sheet of material wrapped partially about the floral grouping.

FIG. 6 is an elevational view showing the upper surface of a modified sheet of material constructed in accordance with the present invention.

FIG. 7 is an elevational view showing the lower surface of the sheet of material of FIG. 6.

FIG. 8 is an elevational view of a plurality of sheets of material constructed as shown in FIGS. 6 and 7 and connected together to form a pad of sheets of material, a floral grouping being shown in FIG. 8 disposed on a portion of the top sheet of material of the pad.

FIG. 9 is a partial perspective view of the pad, similar to FIG. 8, but showing a portion of the top sheet of material wrapped partially about the floral grouping.

DESCRIPTION OF THE PREFERRED EMBODIMENTS

Figure 4:
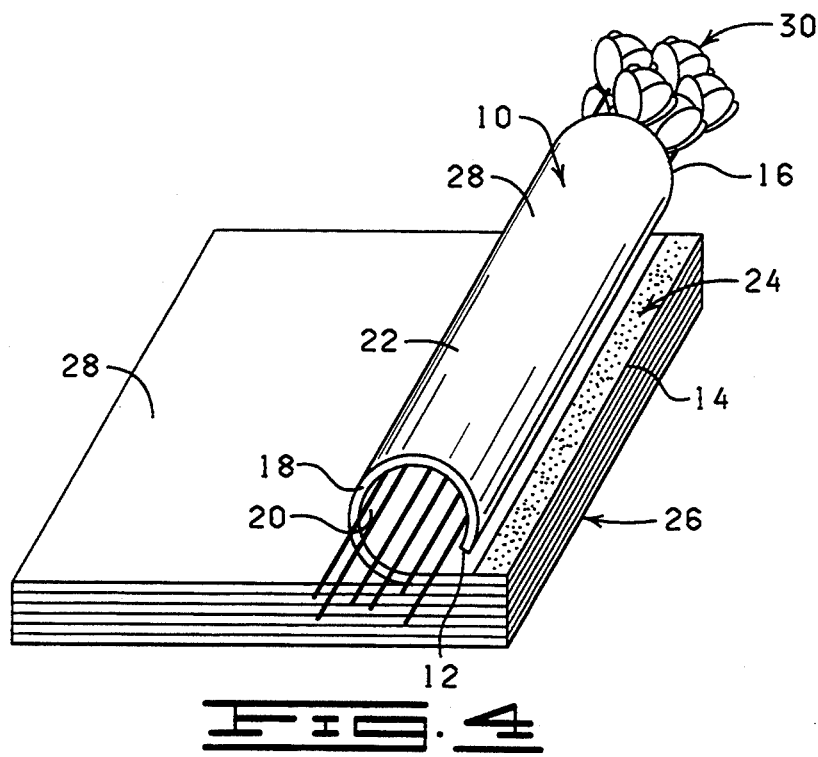
FIG. 4 is a partial perspective view of the pad shown in FIG. 1 with the top sheet of material wrapped generally about the floral grouping just prior to the top sheet of material being connected from the pad.

Shown in FIG. 1 is a typical sheet of material 10 constructed in accordance with the present invention. The sheet of material 10 has a first side 12, a second side 14, a first end 16, a second end 18, an upper surface 20 and a lower surface 22. An adhesive 24 is applied to the upper surface 20 generally near and extending a distance from the second side 14 with the adhesive 24 extending generally between the first and the second ends 16 and 18 of the sheet of material 10. The adhesive 24, as shown in FIG. 1, more particularly, is a strip of adhesive applied to the upper surface 20 of the sheet of material 10.

The present invention contemplates a plurality of sheets of material 10 connected together to form a pad 26 of sheets of material 10, as shown in FIGS. 2–5. The pad 26 comprises a plurality of sheets of material 10 stacked one on top of the other and positioned so that the first sides 12, the second sides 14, the first ends 16 and the second ends 18 of the sheets of material 10 in the pad 26 generally are aligned.

The upper surface 20 of each sheet of material 10 is disposed generally adjacent the lower surface 22 of an adjacent sheet of material 10 in the pad 26. The adhesive 24 strips on the upper surface 20 of each of the sheets of material adhesively connects each sheet of material 10 with the sheet of material 10 disposed thereon for connecting the sheets of material 10 and maintaining sheets of material 10 in the pad 26 form. Each of the sheets of material 10 in the pad 26 is releasably connected to the other sheets of material 10 via the adhesive 24 in a releasable manner so that a sheet of material 10 can be removed from the pad 26 by lifting the sheet of material 10 from the pad 26 and disconnecting the adhesive bond formed by the adhesive 24 strip. The sheets of material 10 are stacked in the form of the pad 26 thereby providing a top sheet of material which is disposed generally on the top of the pad 26 with the other sheets of material 10 being disposed generally under the top sheet of material 28.

Figure 5:
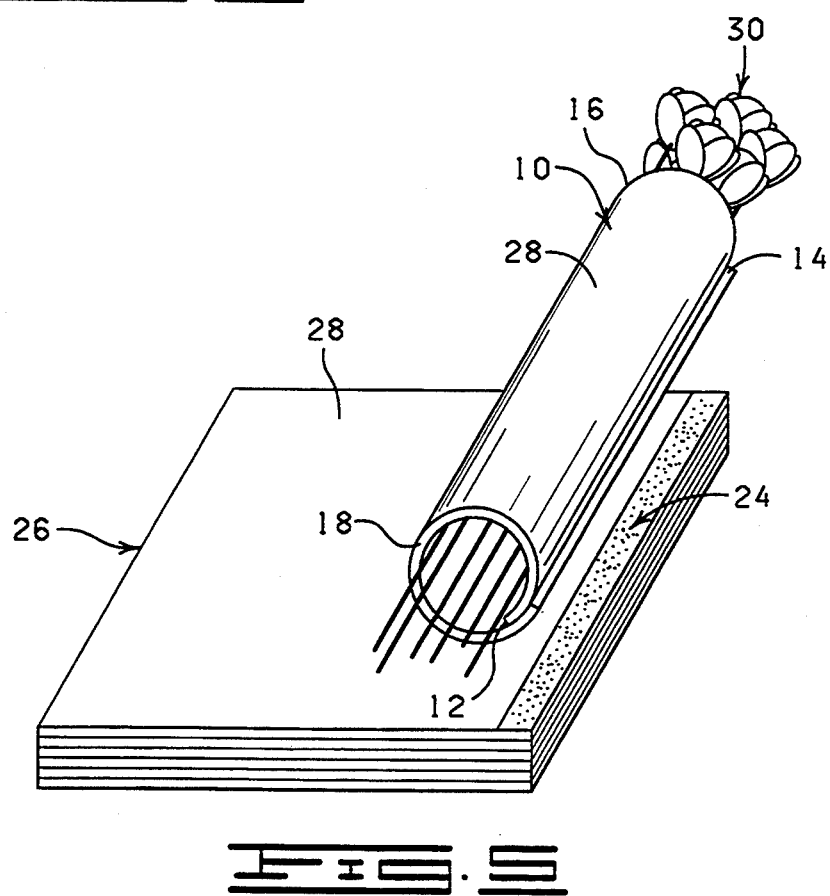
FIG. 5 is an elevational view of the pad shown in FIGS. 2–4 showing the floral grouping wrapped with the top sheet of material just after the top sheet of material has been disconnected from the pad.

A floral grouping 30 is placed on a portion of the top sheet of material 28, as shown in FIG. 2, generally near the first side 12 of the top sheet of material 28. An operator then lifts a portion of the top sheet of material 28 generally near the first side 12 thereof and places the lifted portion of the top sheet of material 28 and places that portion of the top sheet of material 28 generally about a portion of the floral grouping 30, as shown in FIG. 3. In this position, the top sheet of material 28 and the floral grouping 30 are rolled in a general direction 32 (FIG. 3) thereby rolling the top sheet of material 28 generally about the floral grouping 30. The top sheet of material 28 and the floral grouping 30 are continued to be rolled in a rolling direction 34 (FIG. 3) and in the direction 32 generally toward the second side 14 of the top sheet of material 28 until the floral grouping 30 is disposed generally adjacent the second side 14 of the top sheet of material 28, as shown in FIG. 4. In this position, the operator continues to roll the top sheet of material 28 and the floral grouping 30 disposed thereon in the rolling direction 34 and in the direction 32 thereby lifting the top sheet of material from the adhesive 24 strip on the upper surface 20 of the sheet of material 10 disposed generally beneath the top sheet of material 28 and disconnecting the top sheet of material 28 from the adhesive connection between the top sheet of material 28 and the sheet of material 10 disposed under the top sheet of material 28. As the floral grouping 30 and the top sheet of material 28 are rolled over the adhesive 24 strip on the upper surface 20 of the top sheet of material 28, the adhesive 24 strip adhesively connects to an adjacent portion of the top sheet of material 28 thereby securing the top sheet of material 28 securely wrapped generally about the floral grouping 30, as shown in FIG. 5.

When the top sheet of material 28 has been secured about the floral grouping 30 in the manner just described, the sheet of material 10 generally under the top sheet of material 28 then provides a new top sheet of material and the process can be repeated for wrapping additional or other floral groupings.

Each of the sheets of material 10 has a width 36 (FIG. 1) extending generally between the first and the second sides 12 and 14 size sufficient whereby each sheet of material 10 can be wrapped about and encompass the floral grouping 30. Each sheet of material 10 has a length 38 (FIG. 1) extending generally between the first and the second ends 16 and 18 thereof sized sufficient whereby the sheet of material 10 extends over a substantial portion of the floral grouping 30 when the sheet of material 10 has been wrapped about the floral grouping 30 in accordance with the present invention.

"Floral grouping" as used herein means cut fresh flowers, artificial flowers, other fresh and/or artificial plants or other floral materials and may include other secondary plants and/or ornamentation which add to the aesthetics of the overall floral grouping.

The material 10 is constructed from any suitable material that is capable of being wrapped about an item as described herein. Preferably, the material 10 comprises paper (untreated or treated in any manner), cellophane, foil, man-made organic polymer film or combinations thereof. The material 10 also can be cloth (natural or synthetic) or burlap (natural or synthetic) or combinations thereof.

The material 10 may be constructed of a single layer of material or a plurality of layers of the same or different types of materials. Any thickness of the material 10 may be utilized in accordance with the present invention as long as the material 10 is wrappable about an item. Therein as described herein. Additionally, an insulating material such as bubble film, preferable as one of two layers, can be utilized in order to provide needed protection for the item wrapped therein. In a preferred embodiment, the material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils, although the thickness of the sheet of material could be as great as 30 mils.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one man-made organic polymer film is a polypropylene film.

A decorative pattern, such as a color and/or an embossed pattern, and/or other decorative surface ornamentation may be applied to the upper surface 20 and/or the lower surface 22 of the material 10 or portions thereof including, but not limited to printed design, coatings, colors, flocking or metallic finishes. The material 10 also may be totally or partially clear or tinted transparent material.

EMBODIMENT OF FIGS. 6–11

Shown in FIG. 6 is a modified sheet of material 10a which is constructed exactly like the sheet of material 10, except the sheet of material 10a does not include the adhesive 24. Rather, the sheet of material 10a includes a first cohesive applied to the upper surface thereof generally near the second side 14a and extending generally between the first and the second ends 16a and 18a forming a first strip of cohesive 40. The sheet of material 10a also includes a second cohesive 42 (FIGS. 7 and 10) applied to the lower surface 22a of the sheet of material 10a generally near the first side 12a and extending generally between the first and the second ends 16a and 18a to form a second strip of cohesive 42 on the upper surface 22a of the sheet of material 10a, as shown in FIG. 7. Further, as shown in FIG. 7, a third strip of cohesive 44 is applied to the lower surface 22a of the sheet of material 10a with the third cohesive 44 extending generally between the first and the second ends 16a and 18a generally near the second side 14a forming a third strip of cohesive 44 on the lower surface 22a of the sheet of material 10a.

The cohesive materials 40, 42 and 44 each are adapted so that the cohesive materials 40, 42 and 44 each will cohesively bond only to similar cohesive materials and will not bond to portions of the sheet of material 10a which are not coated with like cohesive materials.

When a plurality of the sheets of material 10a are stacked in the form of the pad 26a (shown in FIGS. 8–11), the third strip of cohesive 44 on the lower surface 22 of each of the strips of material 10a is disposed generally adjacent the first strip of cohesive 40 formed on the upper surface 22a of an adjacent sheet of material with the two cohesive strips 40 and 44 forming a bond to connect the sheets of material 10a together in the form of the pad 26a.

Figure 10:
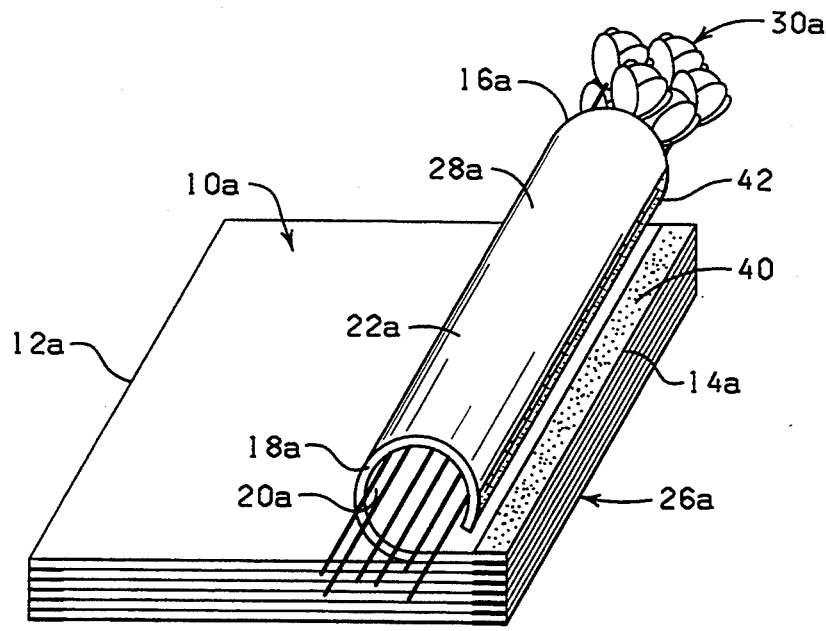
FIG. 10 is a partial perspective view of the pad shown in FIGS. 8 and 9 with the top sheet of material wrapped generally about the floral grouping just prior to the top sheet of material being connected from the pad.
Figure 11:
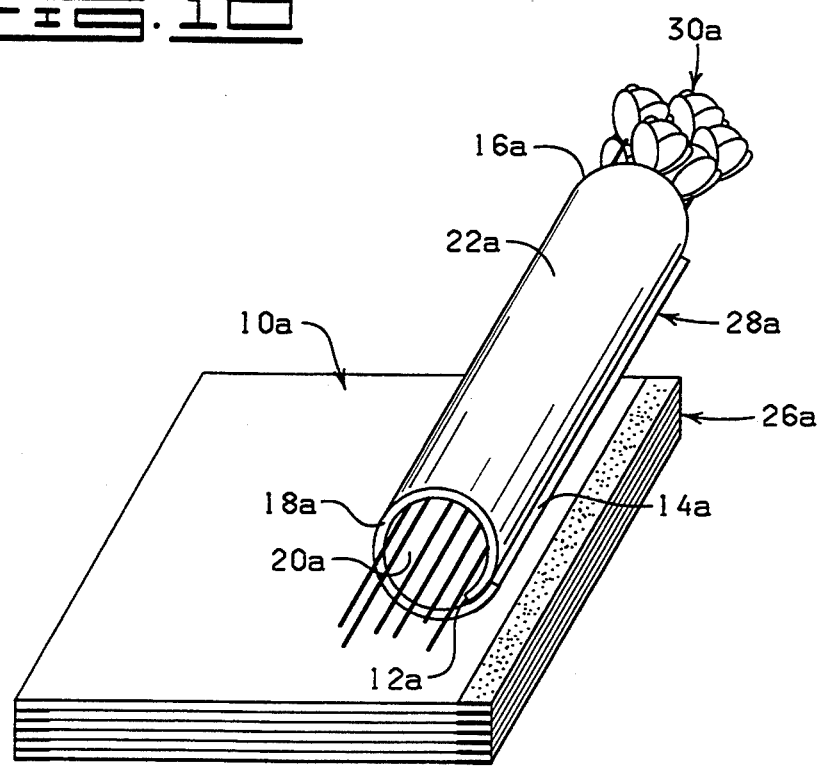
FIG. 11 is an elevational view of the pad shown in FIGS. 8–10 showing the floral grouping wrapped with the top sheet of material just after the top sheet of material has been disconnected from the pad.

The floral grouping 30a is placed on a portion of the top sheet of material 28a generally near the first side 12a, as shown in FIG. 8. The operator then lifts a portion of top sheet of material 28a generally near the first side 12a thereof and places the lifted portion of the top sheet of material 28a generally over a portion of the floral grouping 30, as shown in FIG. 9. The operator then rolls the floral grouping 30 and the top sheet of material 28a in the rolling direction 34a and in the direction 32a thereby wrapping the top sheet of material 28a generally about the floral grouping 30a and moving the floral grouping 30a and the top portion of the top sheet of material 28a wrapped thereabout generally toward the second side 14a to a position wherein the floral grouping 30a with the portion of the top sheet of material 28a disposed thereabout or wrapped thereabout is disposed generally adjacent the second side 14a of the top sheet of material 28a, as shown in FIG. 10. The operator then continues to roll the floral grouping 30a and the top sheet of material 28a in the rolling direction 34a and in the direction 32a to a position wherein the first cohesive strip 40 is disposed adjacent the second cohesive strip 42 and the first and the second cohesive strip 40 and 42a form a bond to secure the top sheet of material 28a generally about the floral grouping 30a as shown in FIG. 11. The operator continues to roll the top sheet of material 28a in the rolling direction 34a and in the direction 32 to a position wherein the third strip of cohesive 44 on the top sheet of material 28a is disconnected from the first strip of cohesive 40 on the sheet of material 10a generally under the top sheet of material 28a thereby disconnecting the top sheet of material 28a from the pad 26a as shown in FIG. 11.

It should be noted that, in lieu of the cohesive strips 40, 42 and 44, the entire upper and lower surfaces 20a and 22a of the sheet of material 10a could be covered with the cohesive material or spots of cohesive material (in lieu of strips) could be included on the upper and lower surfaces 20a and 22a. In a similar manner, the entire upper surface 20 of the sheet of material 10 could be covered with the adhesive material or, the entire upper and lower surfaces 20 and 22 of the sheet of material 10 could be covered with the adhesive material or spots or strips of adhesive material could be selective placed on the upper surface 20 and/or the lower surface 22 of the sheet of material 10a positioned to accomplish the functions of the adhesive 24 described before in connection with the sheet of material 10.

It should also be noted that the sheets of material 10a have a width and a length sized exactly like the width 36 and the length 38 described before.

Changes may be made in the construction and the operation of the various components, elements and assemblies described herein or in the steps or the sequence of steps of the methods described herein without departing from the spirit and scope of the invention as defined in the following claims.

What is claimed is:

1. A method for wrapping an item, comprising:

providing a pad comprising a plurality of sheets of material having a top sheet of material with the other sheets of material being disposed under the top sheet of material, each sheet of material having a first side and a second side, a first end and a second end, an upper surface and a lower surface, each sheet of material having a pressure sensitive adhesive on the upper surface of the sheet of material and each sheet of material comprising paper and having an embossed pattern therein;

providing a floral grouping having an upper end and a stem end, the floral grouping comprising the item;

placing the floral grouping on the top sheet of material; and placing a portion of the top sheet of material over at least a portion of the floral grouping and disconnecting the top sheet of material from the pad of sheets of material, the first side of the sheet of material overlapping portions of the sheet of material and bonding the overlapping portions of the sheet of material by contacting the pressure sensitive adhesive on the upper surface with adjacent overlapping portions of the sheet of material whereby the first side of the sheet of material has bonded to overlapping portions of the sheet of material generally between the first and the second ends of the sheet of material and with the sheet of material substantially encompassing and surrounding a substantial portion of the stem end of the floral grouping and being held about the floral grouping by the bonding of the overlapping portions of the sheet of material, the sheet of material wrapped about the floral grouping forming a wrapper having an opening extending through the lower end thereof and an opening extending through the upper end thereof with the stem end of the floral grouping extending through the opening in the lower end and the flower end of the floral grouping being exposed near the opening in the upper end thereof.

2. The method of claim 1 wherein the step of providing the pad of sheets of material is defined further as having each sheet of material with the adhesive on the upper surface being adhesively connected to a portion of an adjacent sheet of material for cooperating to connect the sheets of material into the pad.

3. The method of claim 2 wherein the step of placing a portion of the top sheet of material over at least a portion of the floral grouping further comprises rolling the top sheet of material and the floral grouping thereby wrapping the top sheet of material about the floral grouping, the adhesive on the top sheet of material being adhesively connected to a portion of the top sheet of material for securing the top sheet of material in a wrapped position about the floral grouping and the top sheet of material being removed from the pad of sheets of material as the top sheet of material is wrapped about the floral grouping.

4. The method of claim 2 wherein the adhesive is on the upper surface of each sheet of material near the second side and extending a distance therefrom toward the first side of each sheet of material, and wherein the step of placing a portion of the top sheet of material about the floral grouping further comprises:

placing a portion of the top sheet of material near the first side thereof over the portion of the floral grouping and rolling the top sheet of material and the floral grouping until the top sheet of material is rolled about the floral grouping and wherein the adhesive on the top sheet of material is adhesively connected to a portion of the top sheet of material as the top sheet of material and the floral grouping are rolled over the adhesive and wherein the top sheet of material is disconnected from the pad as the top sheet of material and floral grouping are rolled over the pad whereby the top sheet of material is lifted from the pad and the adhesive connection between the top sheet of material and a next sheet of material is disconnected.

5. The method of claim 1 wherein the adhesive on each sheet of material adhesively and releasably connects each sheet of material to one other sheet of material whereby one of the sheets of material can be releasably disconnected from another sheet of material by pulling the sheets of material apart.

6. The method of claim 1 wherein the step of placing the top sheet of material about the floral grouping and disconnecting the top sheet of material from the pad leaves the next sheet of material forming a new top sheet of material, and wherein the steps of placing the floral grouping on the top sheet of material, and placing the top sheet of material about the floral grouping are repeated with other floral groupings until substantially all of the sheets of material in the pad have been wrapped about the floral groupings.

7. The method of claim 1 wherein each sheet of material has a thickness in a range from less than about 1 mil to about 30 mils.

8. A method for wrapping an item comprising:

providing a pad comprising a plurality of sheets of material with the sheets of material being connected to form the pad, the pad having a top sheet of material and the other sheets of material being disposed under the top sheet of material, each sheet of material having a first end and a second end, an upper surface and a lower surface, each sheet of material having a pressure sensitive adhesive on the upper surface of the sheet of material and each sheet of material comprising paper and having an embossed pattern therein;

providing a floral grouping having a stem end and a flower end, the floral grouping comprising the item;

placing the floral grouping on the top sheet of material; and placing a portion of the top sheet of material over at least a portion of the floral grouping and disconnecting the top sheet of material from the pad of sheets of material, the sheet of material being wrapped about the floral grouping with the first side of the sheet of material overlapping portions of the sheet of material and bonding the overlapping portions of the sheet of material by contacting the pressure sensitive adhesive on the upper surface with adjacent overlapping portions of the sheet of material whereby the first side of the sheet of material is bonded to overlapping portions of the sheet of material generally between the first and the second ends of the sheet of material whereby there are substantially no loose flaps formed by unbonded portions of the first side of the sheet of material, and with the sheet of material substantially encompassing and surrounding a substantial portion of the flower end of the floral grouping and a substantial portion of the stem end of the floral grouping and being held about the floral grouping by the bonding of the overlapping portions of the sheet of material, the sheet of material being tightly wrapped about the stem end of the floral grouping, the sheet of material wrapped about the floral grouping having an opening extending through the lower end thereof and an opening extending through the upper end thereof with the stem end of the floral grouping extending through the opening in the lower end and the flower end of the floral grouping being exposed near the opening in the upper end thereof, the upper end of the wrapping being loosely wrapped about the flower end of the floral grouping.

9. The method of claim 8 wherein the step of providing the pad of sheets of material is defined further as having each sheet of material with the adhesive on the upper surface being adhesively connected to a portion of an adjacent sheet of material for cooperating to connect the sheets of material into the pad.

10. The method of claim 9 wherein the step of placing a portion of the top sheet of material over at least a portion of the floral grouping further comprises rolling the top sheet of material and the floral grouping thereby wrapping the top sheet of material about the floral grouping, the adhesive on the top sheet of material being adhesively connected to a portion of the top sheet of material for securing the top sheet of material in a wrapped position about the floral grouping and the top sheet of material being removed from the pad of sheets of material as the top sheet of material is wrapped about the floral grouping.

11. The method of claim 9 wherein the adhesive is on the upper surface of each sheet of material near the second side and extending a distance therefrom toward the first side of each sheet of material, and wherein the step of placing a portion of the top sheet of material over at least a portion of the floral grouping further comprises:

placing a portion of the top sheet of material near the first side thereof over the portion of the floral grouping and rolling the top sheet of material and the floral grouping and wherein the adhesive on the top sheet of material is adhesively connected to a portion of the top sheet of material as the top sheet of material and the floral grouping are rolled over the adhesive and the wherein top sheet of material is disconnected from the pad as the top sheet of material and floral grouping are rolled over the pad whereby the top sheet of material is lifted from the pad and the adhesive connection between the top sheet of material and a next sheet of material is disconnected.

12. The method of claim 9 wherein the step of placing the top sheet of material about the floral grouping and disconnecting the top sheet of material from the pad leaves the next sheet of material forming a new top sheet of material, and wherein the steps of placing the floral grouping on the top sheet of material, and placing the top sheet of material about the floral grouping are repeated with other floral groupings until substantially all of the sheets of material in the pad have been wrapped about the floral groupings.

13. The method of claim 8 wherein the adhesive on each sheet of material adhesively and releasably connects each sheet of material to one other sheet of material whereby one of the sheets of material can be releasably disconnected from another sheet of material by pulling the sheets of material apart.

14. A method for wrapping an item comprising:

providing a pad comprising a plurality of sheets of material with the sheets of material being connected to form the pad, the pad having a top sheet of material and the other sheets of material being disposed under the top sheet of material, each sheet of material having, a first end and a second end, an upper surface and a lower surface, the sheet of material having a pressure sensitive adhesive on the upper surface of the sheet of material and each sheet of material comprising paper and having an embossed pattern therein;

providing a floral grouping having a flower end and a stem end, the floral grouping comprising the item;

placing the floral grouping on the top sheet of material; and placing a portion of the top sheet of material over at least a portion of the floral grouping and disconnecting the top sheet of material from the pad of sheets of material, the sheet of material being wrapped about the floral grouping with a portion of the sheet of material overlapping other portions of the sheet of material and bonding the overlapping portions of the sheet of material by contacting the pressure sensitive adhesive on the upper surface with adjacent overlapping portions of the sheet of material whereby the sheet of material is bonded to overlapping portions of the sheet of material so that there are substantially no loose flaps formed by unbonded portions of the sheet of material, and with the sheet of material substantially encompassing and surrounding a substantial portion of the stem end of the floral grouping and being held about the floral grouping by the bonding of the overlapping portions of the sheet of material, the sheet of material being tightly wrapped about the stem end of the floral grouping, the sheet of material wrapped about the floral grouping forming a conically shaped wrapper having an opening extending through a lower end and an opening extending through the upper end thereof with the stem end of the floral grouping extending through the opening in the lower end and the flower end of the floral grouping being exposed near the opening in the upper end thereof, the upper end of the wrapper being loosely wrapped about the flower end of the floral grouping.

15. A method for wrapping an item, comprising:

providing a pad comprising a plurality of sheets of material, each sheet of material having an upper surface and a lower surface, and each sheet of material having adhesive means thereon and each sheet of material comprising paper and having an embossed pattern therein;

providing a floral grouping with the floral grouping comprising the item;

placing the floral grouping on one of the sheets of material in the pad; and placing a portion of the sheet of material over at least a portion of the floral grouping and disconnecting the sheet of material from the pad of sheets of material with portions of the sheet of material overlapping other portions of the sheet of material and bonding the overlapping portions of the sheet of material by contacting the adhesive means on the sheet of material with adjacent overlapping portions of the sheet of material whereby the sheet of material is bonded to overlapping portions of the sheet of material and with the sheet of material encompassing and surrounding a portion of the floral grouping and being held about the floral grouping by the bonding of the overlapping portions of the sheet of material.

16. The method of claim 15 wherein the step of providing the pad of sheets of material is defined further as having each sheet of material with the adhesive means being disposed on the upper surface of each sheet of material and the adhesive means on each sheet of material being adhesively connected to a portion of an adjacent sheet of material for cooperating to connect the sheets of material into the pad.

17. The method of claim 16 wherein the step of placing a portion of the sheet of material over at least a portion of the floral grouping further comprises rolling the sheet of material and the floral grouping thereby wrapping the sheet of material about the floral grouping, the adhesive on the sheet of material being adhesively connected to a portion of the sheet of material for securing the sheet of material in a wrapped position about the floral grouping and the sheet of material being removed from the pad of sheets of material as the sheet of material is wrapped about the floral grouping.

18. The method of claim 16 wherein the step of placing a portion of the sheet of material over at least a portion of the floral grouping further comprises rolling the sheet of material and the floral grouping until the sheet of material is rolled about the floral grouping and wherein the adhesive means on the sheet of material is adhesively connected to a portion of the sheet of material as the sheet of material and the floral grouping are rolled over the adhesive means and wherein the sheet of material is disconnected from the pad as the sheet of material and floral grouping are rolled over the pad whereby the sheet of material is lifted from the pad and the adhesive connection between the sheet of material and a next sheet of material is disconnected.

19. The method of claim 15 wherein the adhesive means on each sheet of material adhesively and releasably connects each sheet of material to one other sheet of material whereby one of the sheets of material can be releasably disconnected from another sheet of material by pulling the sheets of material apart.

20. The method of claim 15 wherein each sheet of material has a thickness in a range from less than about 1 mils to about 30 mils.

21. A method for wrapping an item comprising:

providing a pad comprising a plurality of sheets of material with the sheets of material being connected to form the pad, each sheet of material having an upper surface and a lower surface, and each sheet of material having adhesive means thereon and each sheet of material comprising paper and having an embossed pattern therein;

providing a floral grouping having a stem end and a flower end, the floral grouping comprising the item;

placing the floral grouping on one of the sheets of material in the pad; and placing a portion of the sheet of material over at least a portion of the floral grouping and disconnecting the sheet of material from the pad of sheets of material the sheet of material being wrapped about the floral grouping with portions of the sheet of material overlapping portions of the sheet of material and bonding the overlapping portions of the sheet of material by contacting the adhesive means on the sheet of material with adjacent overlapping portions of the sheet of material whereby the sheet of material is bonded to overlapping portions of the sheet of material whereby there are substantially no loose flaps formed by the unbonded portions of the sheet of material, and with the sheet of material substantially encompassing and surrounding a substantial portion of the flower end of the floral grouping and a substantial portion of the stem end of the floral grouping and being held about the floral grouping by the bonding of the overlapping portions of the sheet of material, the sheet of material being tightly wrapped about the stem end of the floral grouping.

22. The method of claim 21 wherein the step of providing the pad of sheets of material is defined further as providing the pad of sheets of material with each sheet of material having the adhesive means on the upper surface thereof with the adhesive means of each sheet of material for cooperating to connect the sheets of material into the pad.

23. The method of claim 22 wherein the step of
placing a portion of the sheet of material over at least a portion of the floral grouping further comprises rolling the sheet of material and the floral grouping thereby wrapping the sheet of material about the floral grouping, the adhesive on the sheet of material being adhesively connected to a portion of the sheet of material for securing the sheet of material in a wrapped position about the floral grouping and the sheet of material being removed from the pad of sheets of material as the sheet of material is wrapped about the floral grouping.

24. The method of claim 22 wherein the step of placing the floral grouping further comprises:
placing the floral grouping on the upper surface of the sheet of material and near the first side of the sheet of material; and
wherein the step of placing a portion of the sheet of material over at least a portion of the floral grouping further comprises rolling the sheet of material and the floral grouping until the sheet of material is rolled about the floral grouping and wherein the adhesive means on the sheet of material is adhesively connected to a portion of the sheet of material as the sheet of material and the floral grouping are rolled over the adhesive means and wherein the sheet of material is disconnected from the pad as the sheet of material and floral grouping are rolled over the pad whereby the sheet of material is lifted from the pad and the adhesive connection between the sheet of material and a next sheet of material is disconnected.

25. The method of claim 21 wherein the adhesive means on each sheet of material adhesively and releasably connects each sheet of material to one other sheet of material whereby one of the sheets of material can be releasably disconnected from another sheet of material by pulling the sheets of material apart.

26. The method of claim 21 wherein each sheet of material has a thickness in a range from less than about 1 mil to about 30 mils.

27. A method for wrapping an item comprising:
providing a pad comprising a plurality of sheets of material with the sheets of material being connected to form the pad, each sheet of material having adhesive means on the upper surface of the sheet of material and each sheet of material comprising paper and having an embossed pattern therein;
providing a floral grouping having a flower end and a stem end, the floral grouping comprising the item;
placing the floral grouping on one of the sheets of material; and
placing a portion of the sheet of material over at least a portion of the floral grouping and disconnecting the sheet of material from the pad of sheets of material, the sheet of material being wrapped about the floral grouping with a portion of the sheet of material overlapping other portions of the sheet of material and bonding the overlapping portions of the sheet of material by contacting the adhesive means on the upper surface with adjacent overlapping portions of the sheet of material whereby the sheet of material is bonded to overlapping portions of the sheet of material so that there are substantially no loose flaps formed by unbonded portions of the sheet of material, and with the sheet of material substantially encompassing and surrounding a substantial portion of the flower end of the floral grouping and a substantial portion of the stem end of the floral grouping and being held about the floral grouping by the bonding of the overlapping portions of the sheet of material, the sheet of material being tightly wrapped about the stem end of the floral grouping.

28. A method for wrapping an item, comprising:
providing a pad comprising a plurality of sheets of material having a top sheet of material with the other sheets of material being disposed under the top sheet of material, each sheet of material having a first end and a second end, an upper surface and a lower surface, each sheet of material having a pressure sensitive adhesive on the upper surface of the sheet of material and each sheet of material comprising paper and having an embossed pattern therein;
providing a floral grouping having an upper flower end and a stem end, the floral grouping comprising the item;
placing the floral grouping on the top sheet of material; and
placing a portion of the top sheet of material over at least a portion of the floral grouping and disconnecting the top sheet of material from the pad of sheets of material, with a portion of the sheet of material overlapping other portions of the sheet of material and bonding the overlapping portions of the sheet of material by contacting the pressure sensitive adhesive on the upper surface with adjacent overlapping portions of the sheet of material whereby the sheet of material is bonded to overlapping portions of the sheet of material and with the sheet of material substantially encompassing and surrounding a substantial portion of the stem end of the floral grouping and being held about the floral grouping by the bonding of the overlapping portions of the sheet of material, the sheet of material wrapped about the floral grouping forming a wrapper having an opening extending through the lower end thereof and an opening extending through the upper end thereof with the stem end of the floral grouping extending through the opening in the lower end and the flower end of the floral grouping being exposed near the opening in the upper end thereof.

29. The method of claim 28 wherein the step of providing the pad of sheets of material is defined further as having each sheet of material with the pressure sensitive adhesive on the upper surface being adhesively connected to a portion of an adjacent sheet of material for cooperating to connect the sheets of material into the pad.

30. The method of claim 29 wherein the step of
placing a portion of the top sheet of material over at least a portion of the floral grouping further comprises rolling the top sheet of material and the floral grouping thereby wrapping the top sheet of material about the floral grouping, the adhesive on the top sheet of material being adhesively connected to a portion of the top sheet of material for securing the top sheet of material in a wrapped position about the floral grouping and the top sheet of material being removed from the pad of sheets of material as the top sheet of material is wrapped about the floral grouping.

31. The method of claim 29 wherein the step of placing a portion of the top sheet of material over at least a portion of the floral grouping further comprises rolling the top sheet of material and the floral grouping until the top sheet of material is rolled about the floral grouping and wherein the adhesive on the top sheet of material is adhesively connected to a portion of the top sheet of material as the floral grouping is rolled over the adhesive and wherein the top sheet of material is disconnected from the pad as the top sheet of material and the floral grouping are rolled over the pad whereby the top sheet of material is lifted from the pad and the adhesive connection between the top sheet of material and a next sheet of material is disconnected.

32. The method of claim 28 wherein the pressure sensitive adhesive on each sheet of material adhesively and releasably connects each sheet of material to one other sheet of material whereby one of the sheets of material can be releasably disconnected from the another sheet of material by pulling the sheets of material apart.

33. The method of claim 28 wherein the step of placing the top sheet of material about the floral grouping and disconnecting the top sheet of material from the pad leaves the next sheet of material forming a new top sheet of material, and wherein the steps of placing the floral grouping on the top sheet of material, and placing the top sheet of material about the floral grouping are repeated with other floral groupings until substantially all of the sheets of material in the pad have been wrapped about the floral groupings.

34. The method of claim 28 wherein each sheet of material has a thickness in a range from less than about 1 mil to about 30 mils.

35. A method for wrapping an item comprising:
providing a pad comprising a plurality of sheets of material with the sheets of material being connected to form the pad, the pad having a top sheet of material and the other sheets of material being disposed under the top sheet of material, each sheet of material having a first end and a second end, an upper surface and a lower surface, each sheet of material having a pressure sensitive adhesive on the upper surface of the sheet of material and each sheet of material comprising paper and having an embossed pattern therein;
providing a floral grouping having a stem end and a flower end, the floral grouping comprising the item;
placing the floral grouping on the top sheet of material; and
placing a portion of the top sheet of material over at least a portion of the floral grouping and disconnecting the top sheet of material from the pad of sheets of material, the sheet of material being wrapped about the floral grouping with portions of the sheet of material overlapping portions of the sheet of material and bonding the overlapping portions of the sheet of material by contacting the pressure sensitive adhesive on the upper surface with adjacent overlapping portions of the sheet of material whereby the sheet of material is bonded to overlapping portions of the sheet of material whereby there are substantially no flaps formed by unbonded portions of the sheet of material, and with the sheet of material substantially encompassing and surrounding a substantial portion of the flower end of the floral grouping and a substantial portion of the stem end of the floral grouping and being held about the floral grouping by the bonding of the overlapping portions of the sheet of material, the sheet of material being tightly wrapped about the stem end of the floral grouping, the sheet of material wrapped about the floral grouping having an opening extending through the lower end thereof and an opening extending through the upper end thereof with the stem end of the floral grouping extending through the opening in the lower end and the flower end of the floral grouping being exposed near the opening in the upper end thereof, the upper end of the wrapping being loosely wrapped about the flower end of the floral grouping.

36. The method of claim 35 wherein the step of providing the pad of sheets of material is defined further as having each sheet of material adhesively connected to a portion of an adjacent sheet of material for cooperating to connect the sheets of material into the pad.

37. The method of claim 36 wherein the adhesive on each sheet of material adhesively and releasably connects each sheet of material to one other sheet of material whereby one of the sheets of material can be releasably disconnected from another sheet of material by pulling the sheets of material apart.

38. The method of claim 36 wherein the step of placing a portion of the top sheet of material over at least a portion of the floral grouping further comprises rolling the top sheet of material and the floral grouping thereby wrapping the top sheet of material about the floral grouping, the adhesive on the top sheet of material being adhesively connected to a portion of the top sheet of material for securing the top sheet of material in a wrapped position about the floral grouping and the top sheet of material being removed from the pad of sheets of material as the top sheet of material is wrapped about the floral grouping.

39. The method of claim 36 wherein the step of
placing a portion of the top sheet of material over at least a portion of the floral grouping further comprises rolling the top sheet of material and the floral grouping until the top sheet of material is rolled about the floral grouping and wherein the adhesive on the top sheet of material is adhesively connected to a portion of the top sheet of material as the top sheet of material and the floral grouping are rolled over the adhesive and wherein the top sheet of material is disconnected from the pad as the top sheet of material and the floral grouping are rolled over the pad whereby the top sheet of material is lifted from the pad and the adhesive connection between the top sheet of material and a next sheet of material is disconnected.

40. The method of claim 35 wherein the placing of the top sheet of material about the floral grouping and disconnecting the top sheet of material from the pad leaves the next sheet of material forming a new top sheet of material, and wherein the steps of placing the floral grouping on the top sheet of material, and placing the top sheet of material about the floral grouping are repeated with other floral groupings until substantially all of the sheets of material in the pad have been wrapped about the floral groupings.

* * * * *

UNITED STATES PATENT AND TRADEMARK OFFICE
CERTIFICATE OF CORRECTION

PATENT NO. : 5,448,875
DATED : September 12, 1995
INVENTOR(S) : Weder

It is certified that error appears in the above-identified patent and that said Letters Patent is hereby corrected as shown below:

Title page beginning "[*]Notice", delete "2093" and substitute therefor --2010--.

Column 1, line 46, after "is", delete "a" and substitute therefor --an--.

Column 1, line 61, delete "connected" and substitute therefor --disconnected--.

Column 2, line 14, delete "connected" and substitute therefor --disconnected--.

Column 3, line 37, delete "size" and substitute therefor --sized--.

Signed and Sealed this

Fourth Day of June, 1996

Attest:

BRUCE LEHMAN

Attesting Officer

Commissioner of Patents and Trademarks